United States Patent [19]
Williams, Jr.

[11] Patent Number: 5,690,348
[45] Date of Patent: Nov. 25, 1997

[54] HEAVY DUTY SLIDING JACK POST STAND FOR TRAILERS

[76] Inventor: Thomas M. Williams, Jr., 2310 Old Oxford Highway, Durham, N.C. 27704

[21] Appl. No.: 519,875

[22] Filed: Aug. 28, 1995

[51] Int. Cl.⁶ .................................................. B60S 9/00
[52] U.S. Cl. ...................... 280/477; 280/475; 254/DIG. 1
[58] Field of Search ................................ 280/475, 477, 280/478.1, 762, 763.1; 254/419, 420, DIG. 1

[56] References Cited

U.S. PATENT DOCUMENTS

| | | | |
|---|---|---|---|
| 3,740,077 | 6/1973 | Williams | 280/475 |
| 4,431,208 | 2/1984 | Geeves | 280/475 |
| 4,537,416 | 8/1985 | Linaburg | 280/478 |
| 4,911,460 | 3/1990 | DePaula | 280/478.1 |
| 4,961,589 | 10/1990 | Faurenhoff | 280/475 |
| 5,009,444 | 4/1991 | Williams, Jr. | 280/477 |
| 5,195,769 | 3/1993 | Williams, Jr. | 280/477 X |
| 5,340,143 | 8/1994 | Williams, Jr. | 280/477 X |

Primary Examiner—Kevin Hurley
Attorney, Agent, or Firm—Olive & Olive. P.A.

[57] ABSTRACT

A sliding jack post stand for a trailer is capable of movement in either of two directions by application of downward force on a lever by an operator standing on one side of a trailer to be moved. A low friction plate is mounted above and spaced from a ground plate on an intermediate spacer and support plate. A slider having parallel side edges bent to enclose opposed side edges of the low friction and support plates in sliding relation supports the lower end of a trailer jack post. The slider has a fulcrum located opposite a series of nests formed in the base plate. The base plate also has a fulcrum located opposite a series of nests formed in the slider. Movement in a first linear direction is accomplished by a force applied downwardly on the handle of an articulated lever placed against one fulcrum and one of the series of nests. Movement in a second linear direction is accomplished by a force downwardly on the handle of the lever placed against the other fulcrum and one of the other nests thereby minimizing the opportunity for back injury.

9 Claims, 7 Drawing Sheets

HEAVY DUTY SLIDING JACK POST STAND FOR TRAILERS

FIELD OF THE INVENTION

This invention relates to a slidable jack post support used to position the front end of a commercial, heavy duty trailer when not connected to a towing vehicle.

BACKGROUND OF THE INVENTION

The present invention represents an improvement over the slidable jack post support described in U.S. Pat. No. 5,340,143 for a SLIDABLE SUPPORT FOR HEAVILY LOADED TRAILER JACK POST, issued to the present inventor. The teachings of the '143 patent are incorporated herein by reference.

As described in the '143 patent, virtually all trailers, other than very light duty trailers, have a vertically extensible leg or jack post or a pair of such legs or posts which are adapted to raise the front end of the trailer to an appropriate level to be engaged by a hitching device on a towing vehicle or to support the front end of the trailer when parked. In the case of a commercial freight trailer, the so-called fifth wheel on the towing vehicle, referred to as the tractor, includes a sliding engagement plate with an enlarged entrance slot for easy engagement by a pin attached to the trailer. This enlarged entrance slot compensates for a certain amount of misalignment between the tractor and the trailer and thus assists in slightly shifting the trailer relative to the tractor during hitching.

In another type of commercial application a trailer is attached to and towed by a full truck, as different from a tractor. A typical example of a truck pulling a heavily loaded trailer is that of a utility company service truck towing a trailer on which utility poles, e.g. telephone or power poles, are transported. This type heavy duty trailer arrangement typically involves use of a hitching loop on the trailer and a mating pintle hook on the truck, which arrangement does not compensate at all for misalignment between the two vehicles. Essentially, the truck must be in perfect alignment in order to hitch the trailer to the truck.

Obviously, perfect alignment is not easily accomplished by backing a truck to a heavily loaded trailer. To correct for the common misalignment which occurs, the truck operator may attempt to move the heavily loaded trailer sideways manually. While this may be possible when the trailer has a dolly wheel on the bottom of its jack post and the wheel is supported on a hard and level surface, in other circumstances this movement cannot be done. The weight of a load of utility poles is great and even to the extent it may be balanced across the trailer's wheels still presents a formidable weight to move. A 20,000 pound tongue load is possible for this type trailer. In a conventional, widely employed type of heavy duty trailer, a base plate is secured to the lower end of the jack post. Support surface conditions, trailer load and jack post type all contribute to the difficulty of laterally shifting the front of the trailer during hitching. It is thus not uncommon for a truck operator to sustain a back injury while attempting to shift the front end of a heavily loaded trailer. As discussed in the '143 patent, lifting of a lever for the purpose of laterally shifting the trailer can cause a back injury to an operator. In contrast, a downward force applied to a lever for the purpose of laterally shifting the trailer typically does not contribute to a back injury.

Practical slidable jack stands have been achieved which permit the lateral movement of a front portion of a relatively lightly loaded trailer such as a boat trailer. Such slidable jack stands suitable for relatively lightly loaded trailers are described in applicant's prior U.S. Pat. Nos. 5,009,444 and 5,195,769, the teachings of which are also incorporated herein by reference.

While the slidable support described and claimed in the '143 patent provides a solution to various preexisting problems with a heavily loaded trailer, further difficulties remain. The slidable support described in the '143 patent moves in a first direction when a force is applied in that same direction by a lever. Movement in an opposite direction requires an oppositely directed lever force. This change in force direction may be accomplished either by the user changing from a first to a second side of the trailer being moved for applying an opposite force of the lever, or by remaining on the same side of the trailer and changing the direction of force to an upward force on the lever handle. Moving to an opposite side of the trailer is frequently inconvenient, and an upward lever force applied on one side or the other of the trailer when required reintroduces the problem of potential back injury.

Therefore, it is an object of the present invention to provide a sliding jack post stand which allows for alignment of a trailer with a hitch with a minimum of physical force.

It is an additional object of the present invention to provide a sliding jack post stand which is operative in either of two selected directions and in a manner so as to avoid back injury to the user.

A more specific object is to provide a sliding jack post stand which can be moved in either of two opposite directions by a downward force applied to a lever and while the operator stands on the same side of the trailer.

Other objects and advantages will be more fully apparent from the following disclosure and appended claims.

SUMMARY OF THE INVENTION

The present invention provides a slidable trailer jack post support apparatus which can be operated to move the trailer hitching device in either of two directions along a line perpendicular to the centerline of the trailer. The slidable support apparatus is particularly suited for adjusting the alignment between a heavily loaded trailer and a towing vehicle. Such support apparatus comprises an assembly which, in the preferred embodiment, is permanently affixed to the foot plate of an extensible jack post of a trailer, and which assembly is able to move the front end of a heavily loaded trailer laterally. The support assembly has a base support member adapted to rest on a paved or unpaved ground surface and an upper support or slider member adapted to slide linearly on the base support member. A low-friction bearing plate is located between the base member and slider member. Except for the low-friction bearing plate, all the parts of the slidable support assembly of the invention are metal and are welded or otherwise secured together. A fulcrum is mounted to the slider member and is positioned above a series of bearing surfaces, or nests, which are disposed on the base member such that a downward force on a lever placed against the fulcrum with its end inserted in a nest causes the slider member to move in one direction. A similar fulcrum is mounted to the base member and a respective set of nests disposed on the slider in relation thereto. Downward force on the lever causes the slider member to move in an opposite direction with respect to the base member causing the front of the trailer to be positioned so that its hitching loop is aligned with the mating pintle hook of the towing vehicle. The lever is articulated so as to be capable of transmitting a force only in the direction imposed by a downward force.

Also, while presently anticipating that the sliding support assembly of the invention will find its greatest application in being permanently attached to the jack leg, it is contemplated that a lower portion of a heavily loaded jack post could be received by a socket or other means secured to the upper plate surface of the slider member and be shifted by the described improved fulcrum and lever structure of the invention.

DETAILED DESCRIPTION OF THE INVENTION

The present invention, as an improvement over the teachings of prior U.S. Pat. No. 5,340,143, significantly reduces the potential for back injury while creating an easily movable, sliding jack post stand capable of operating with a variety of trailer types and loads. The sliding jack post stand described in detail below may be used as a permanently installed or a removable unit and may be suitably constructed to be capable of supporting tongue weights up to 20,000 pounds.

Figure 1:
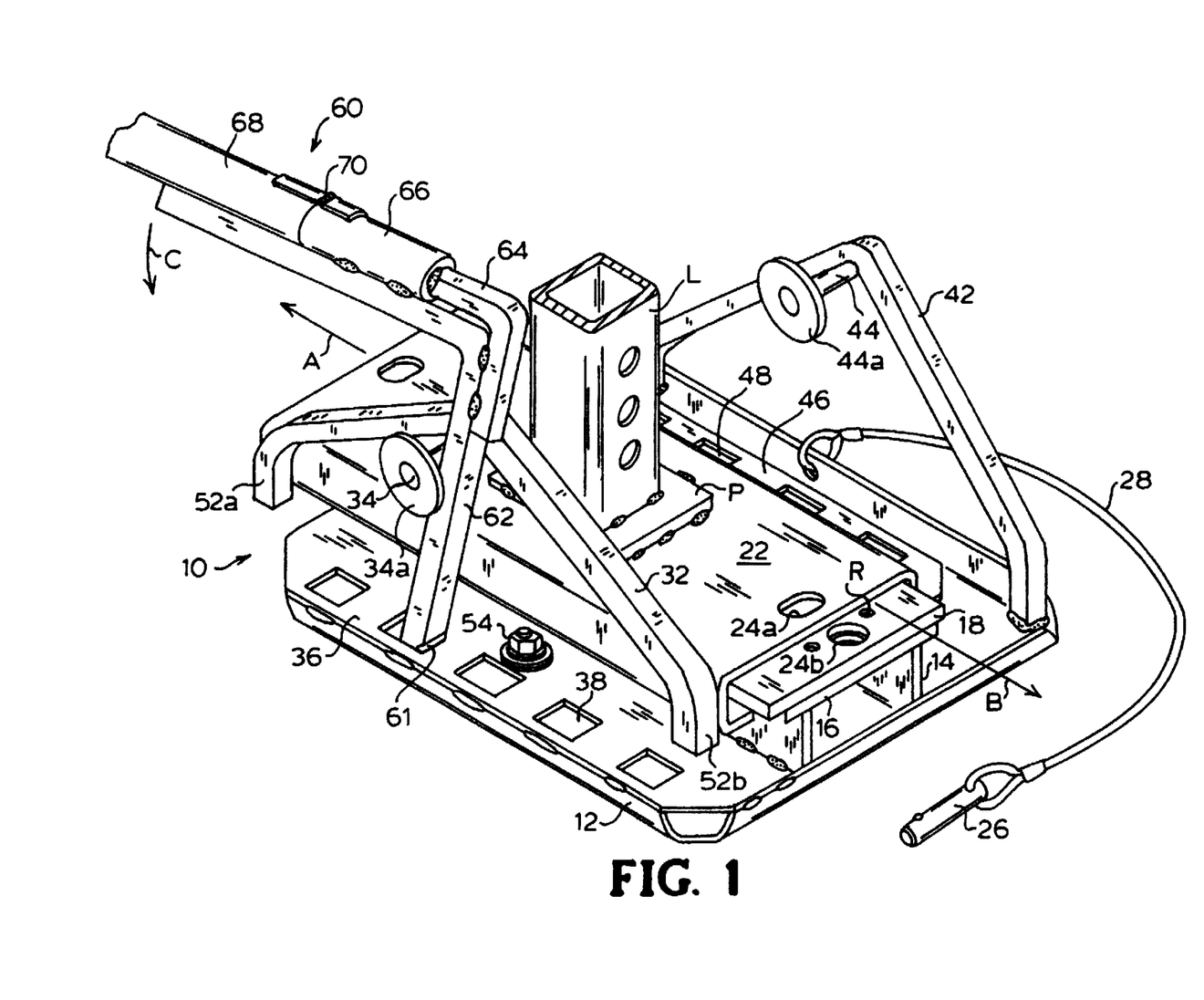
FIG. 1 is a perspective view of a sliding jack post stand according to the invention with its slider being moved in a first direction by a downward force applied to an articulated lever engaging a first side of the sliding stand.
Figure 2:
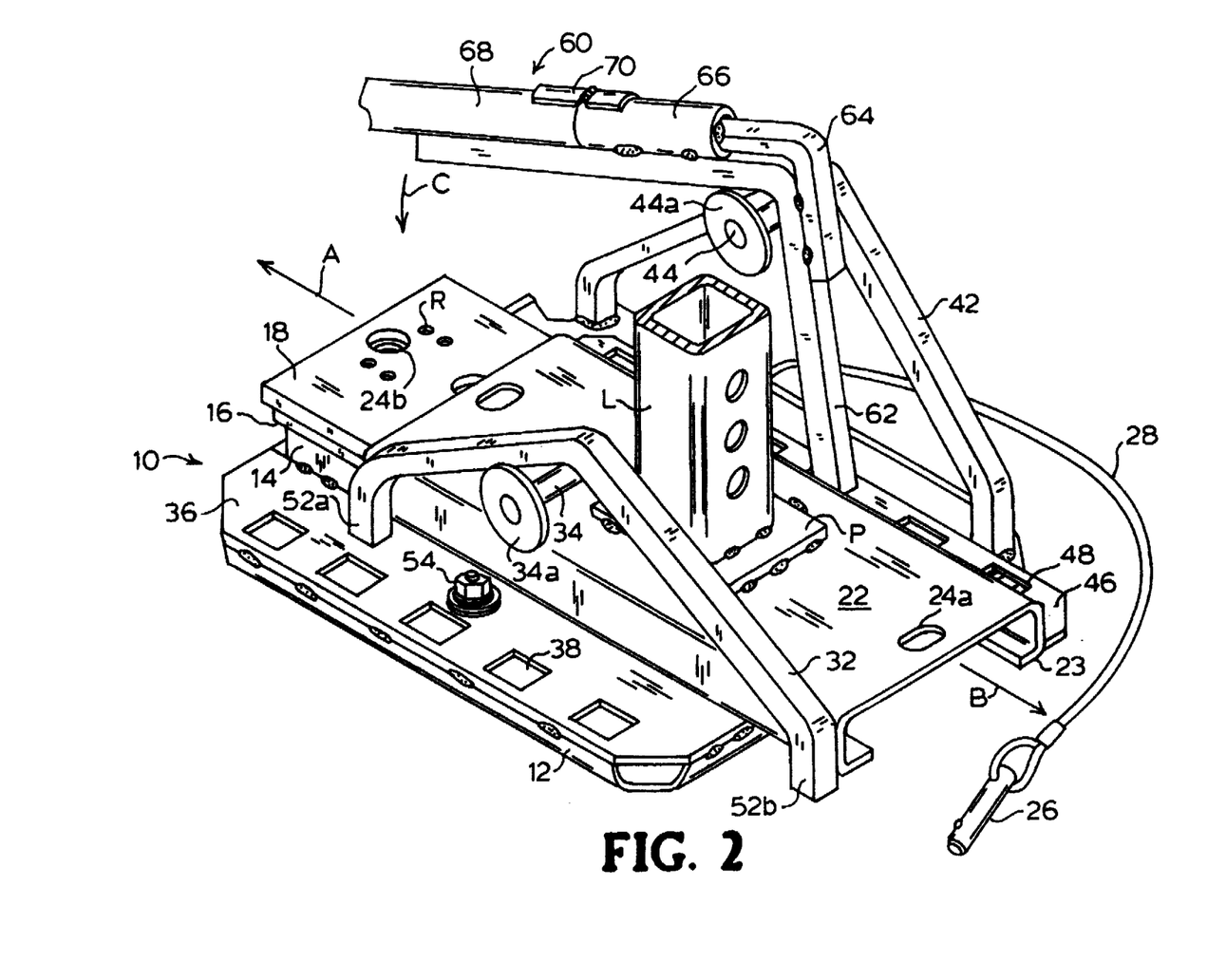
FIG. 2 is the view of FIG. 1 with the slider being moved in a second direction also achieved by a downward force applied to the articulated lever engaging a second side of the sliding stand.
Figure 8:
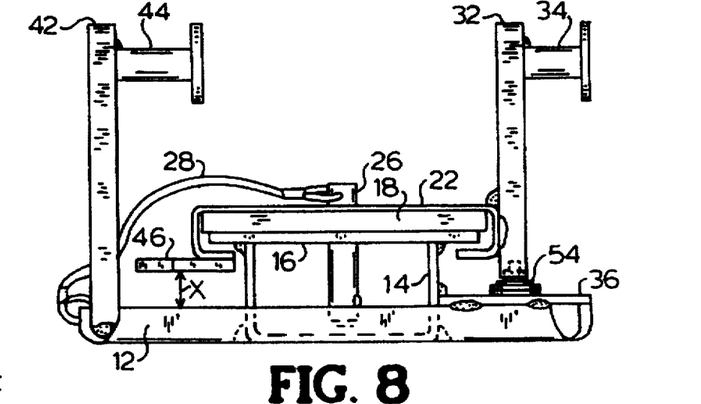
FIG. 8 is an end elevation view of the sliding jack post stand of the present invention.
Figure 9:
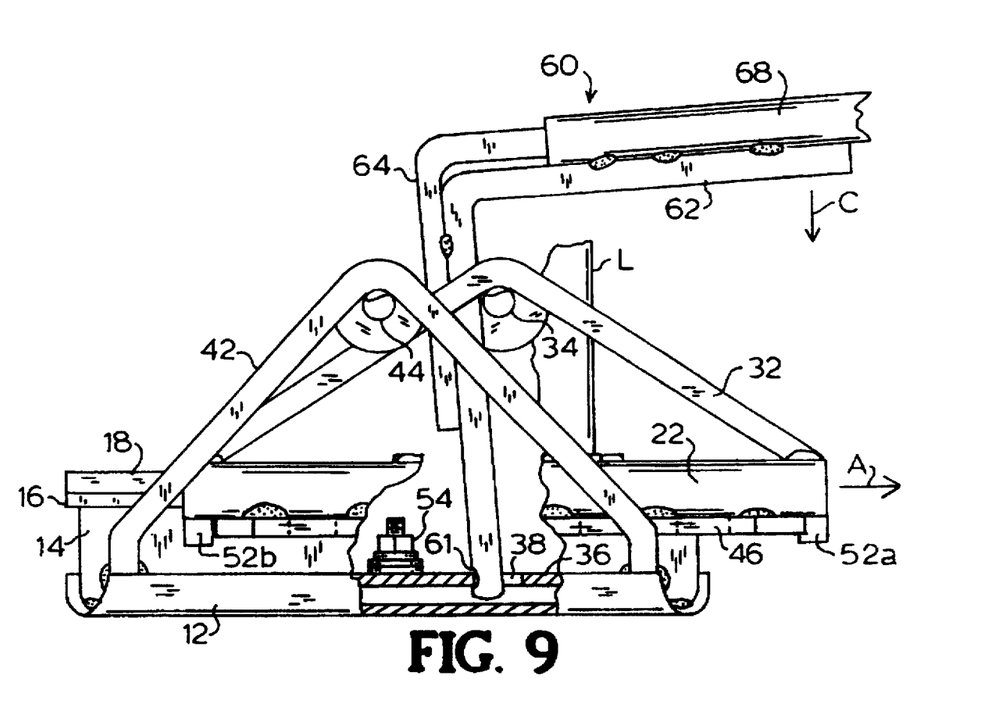
FIG. 9 is a side elevation view of the sliding jack post stand of the present invention as it is being moved to the right by downward movement of the lever handle.

The sliding jack post stand 10 of the invention is illustrated in perspective assembly in FIGS. 1 and 2 and in end view of FIG. 8. Jack post stand 10 is supported on substantially rectangular ground engaging base plate 12 formed with upwardly bent edges. A channel-shaped spacer 14 is welded to base plate 12 in alignment therewith, and support plate 16 is mounted on spacer 14, for example by welding, so as to be substantially parallel to and spaced above base plate 12. Low friction plate 18 is fastened, such as by rivets R, in planar contact with support plate 16. The combined base plate 12, spacer 14, support plate 16 and low friction plate 18 comprise a base assembly onto which a slider 22 is mounted in sliding relation. As seen best in exploded view in FIG. 4, slider 22 is configured with edge portions 23 bent inwardly a distance D below its top plate and parallel thereto so as to limit lateral motion of slider 22 and to slidingly track longitudinally along the assembled support plate 16 and low friction plate 18 as indicated by arrows A-B (FIGS. 1 and 2). A stop 54, preferably in the form of a bolt and nut, is installed in a preformed hole in base nest plate 36 in a position so as to intercept lower edges 52a, 52b of slider fulcrum frame 32 (see FIGS. 1, 2) and thereby limit longitudinal motion of slider 22.

A jack post leg L with foot plate P is connected to the top portion of slider 22, typically by welding. The foot plate P on a jack post leg L is normally supplied with upwardly bent left and right edges which may be removed or may remain in place when foot plate P is mounted on slider 22. In the instance of a trailer having a support wheel (not shown) on the bottom end of its jack post, a wheel receiving cup (not shown) may be formed on slider 22 to receive the wheel. The jack post stand 10 so equipped is easily removed for use with another trailer.

Figure 4:
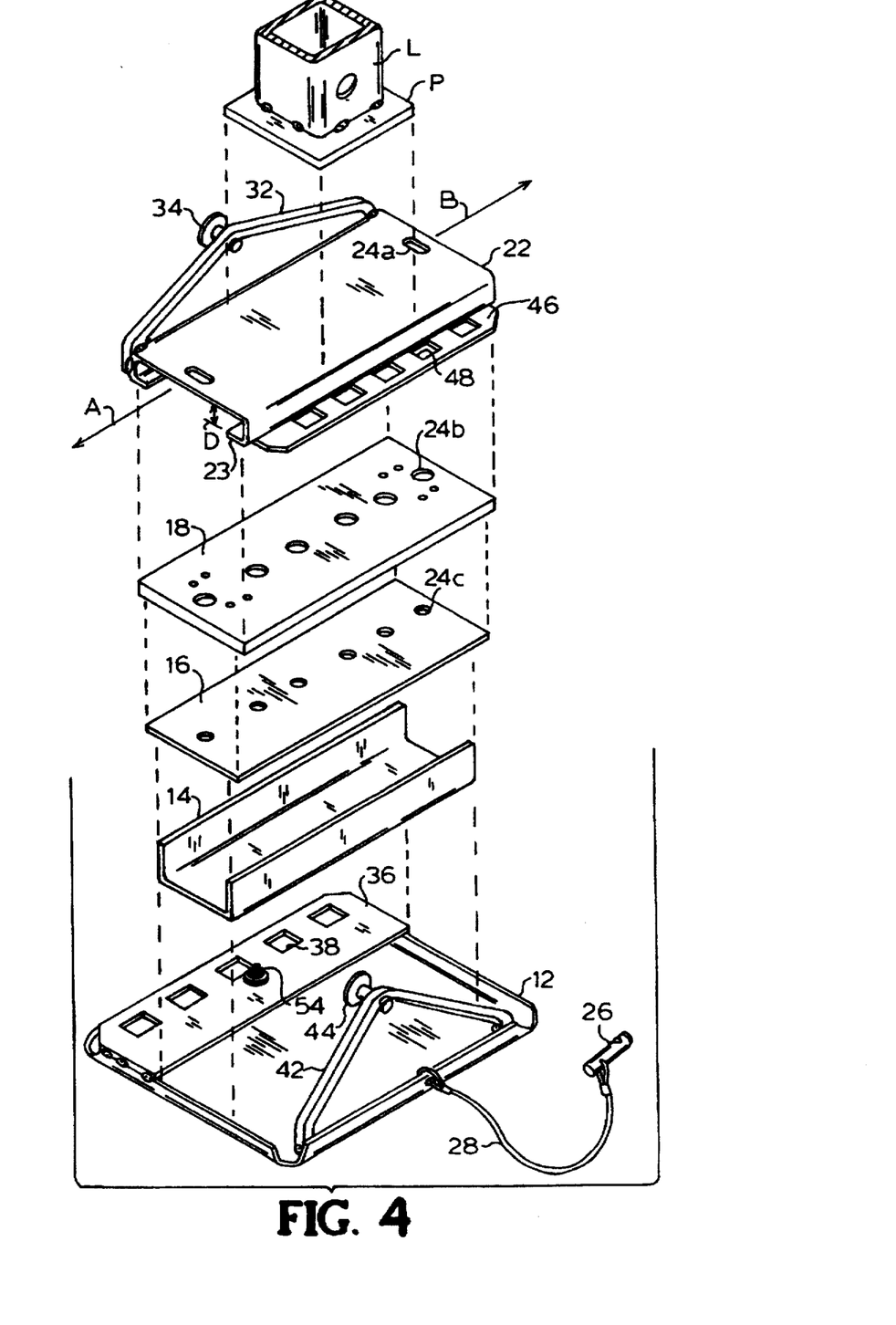
FIG. 4 is an exploded perspective view of the sliding jack post stand of the present invention.

The unique pair of fulcrum-nest plate configurations of the invention is best seen in the exploded view of FIG. 4. Base fulcrum 44 is welded to base fulcrum frame 42, which is, in turn welded to base plate 12 along a first edge thereof. Base nest plate 36, in which linearly aligned, square base nests 38 are formed, is welded along an opposite edge of base plate 12. A slider fulcrum 34 is welded to a slider fulcrum frame 32 which is welded to slider 22 on a first edge thereof. Slider nest plate 46 in which a series of linearly aligned square sliding nests 48 are formed, is welded on an opposite edge of slider 22. On assembly, as seen in FIGS. 1, 2, 6, 8 and 9, base fulcrum 44 resides a selected distance above slider nest plate 46 and is vertically aligned therewith. It is to be noted that nest plate 46 is spaced a distance X above, so as to pass over, the upwardly turned edges of base plate 12 without contact as best seen in FIG. 8. Also when assembled, slider fulcrum 34 resides a selected distance above and aligned with base nest plate 36. The separation distance between the respective fulcrums and plates is determined primarily by the vertical height of spacer 14 in combination with the thickness of slider 22. Base fulcrum 44 and slider fulcrum 34 are in substantial alignment with each other when slider fulcrum 34 assumes its central position as in FIG. 1.

Figure 3:
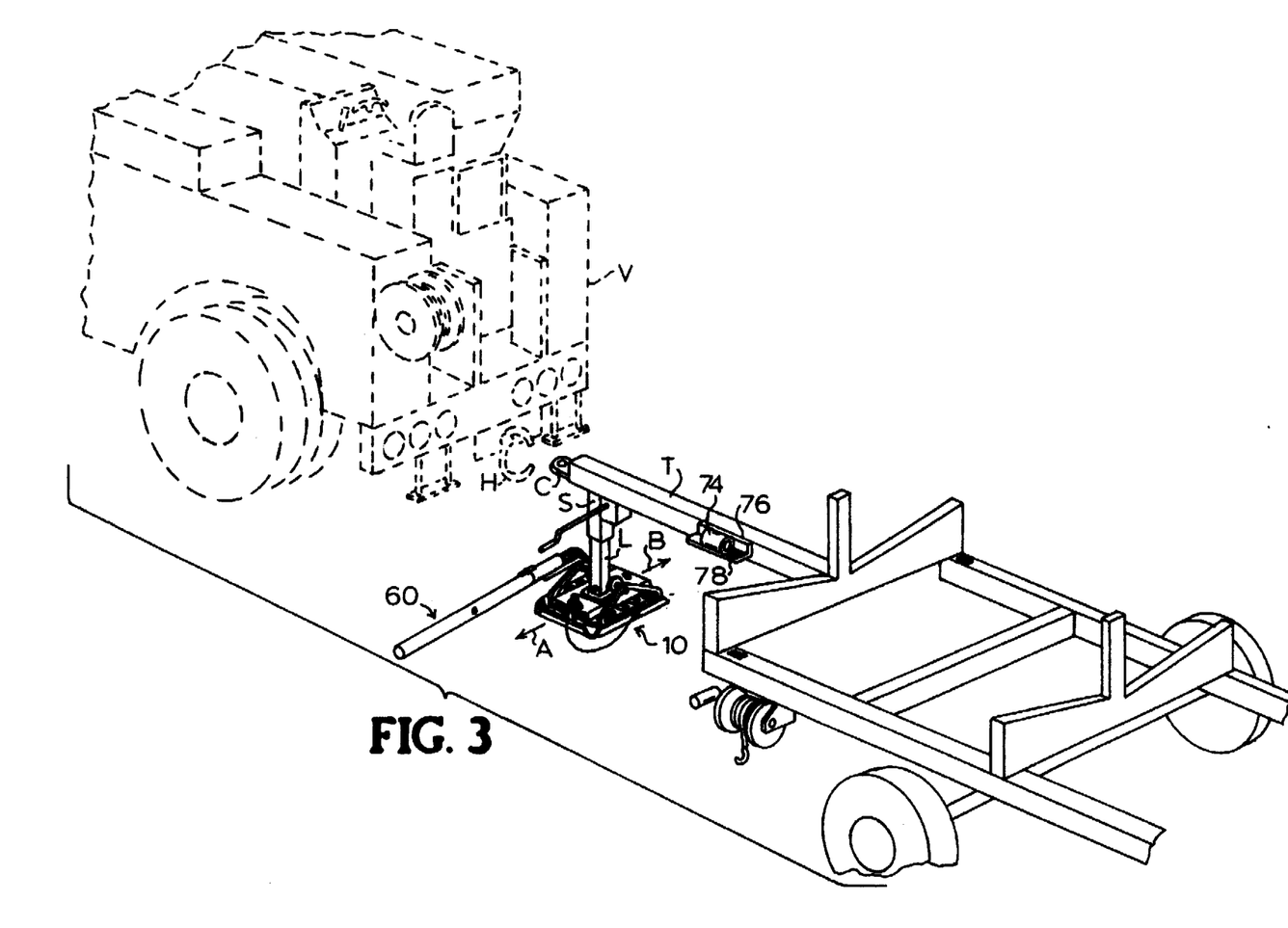
FIG. 3 is a perspective view of the sliding jack post stand of the invention assembled to the jack post of a trailer positioned for engagement by a towing vehicle, shown in dashed lines.
Figure 10:
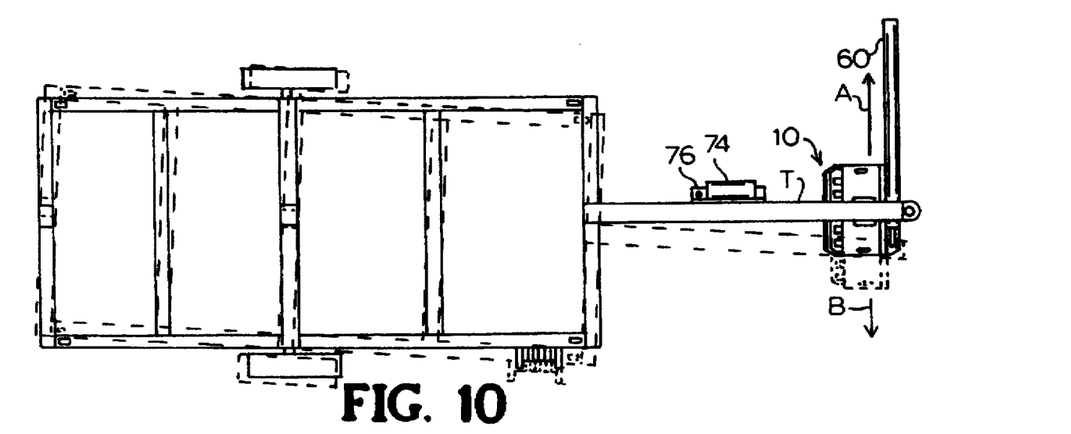
FIG. 10 is a top plan view of a trailer equipped with the sliding jack post stand of the invention as it is moved between solid line and dashed line positions to be in alignment with a truck hitch apparatus.

When sliding jack post stand 10 is connected to the lower end of a jack post L mounted on trailer tongue T, as illustrated in FIG. 3, sliding jack post stand 10 is aligned to facilitate movement left (direction A) and right (direction B) relative to the centerline of the trailer (FIG. 10). While the operator is on the left side (A) of trailer tongue T, movement is imparted in direction A by pushing down on the end of lever 60 which is placed across fulcrum 34 with bar 62 engaging a base nest 38 as seen in detail in FIGS. 1 and 9. The lateral motion of trailer tongue T is accomplished by downward force being applied to "L" shaped lever 60. Movement in direction B is accomplished with the operator remaining on the left side (A) of trailer tongue T and moving the lever 60 to engage base fulcrum 44 and slider nest 48 (see FIG. 2) and again applying downward force to lever 60. Bar 62 is preferably square in cross section to fit loosely in square nests 38, 48 but without the ability to rotate. In FIGS. 1, 2, the non-rotational aspect of square bar 62 engaging a selected square nest 38 or 48 is illustrated as being further enhanced by a flange 34a, 44a (FIG. 1) mounted on the outer end of each respective fulcrum 34, 44. A square configured bar 62 also improves the bearing contact length on fulcrums 34, 44.

Figure 7:
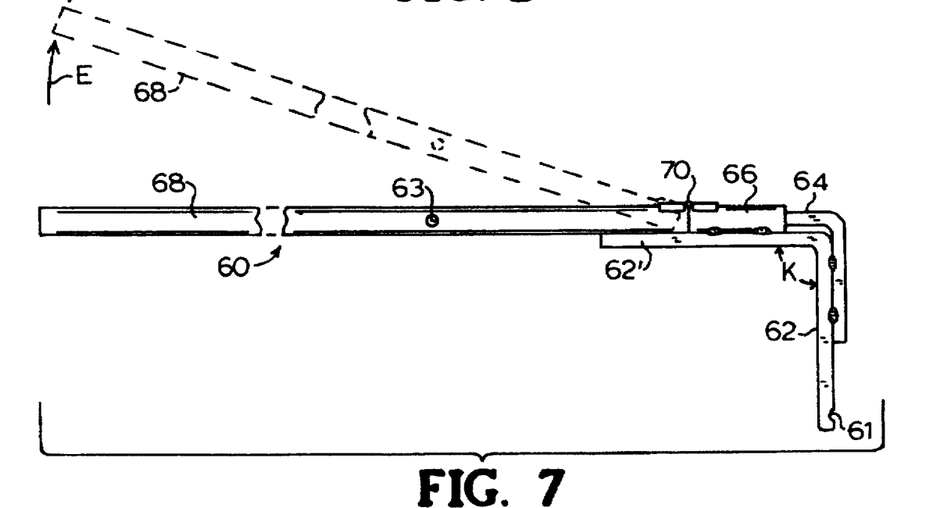
FIG. 7 is a side elevation view of an articulated lever according to the present invention, showing in solid lines, the handle thereof at its normal angle to the shank and in dashed lines, showing the angle assumed by the lever handle when lifted.

The bi-directional movement of slider 22 can thus be accomplished by downward pressure on lever 60 applied by an operator standing on one side of the trailer tongue. Further detail of lever 60 is shown in FIG. 7. A hinge 70 is fixedly attached to connect handle 68 and shank 66 on an upper edge thereof so as to permit articulation. Hinge 70 is configured and positioned to permit handle 68 to open freely if pulled upwardly in the illustrated dashed line position (FIG. 7) according to arrow E, and to allow the application of force when pushed downward according to arrow C. Bar 62 is formed with an angle K of approximately 90° to promote use of lever 60 primarily when handle 68 is substantially horizontal. Bar 62 includes an engagement end formed with notch 61 on one outwardly facing side thereof to securely engage the bearing nests in respective plates 36, 46. Brace 64 is similarly bent to a 90° angle K and is welded with a vertical portion thereof in contact with the vertical stem of bar 62. Brace 64 is welded into shank 64 and bar 62 is welded externally thereto. Brace 64 does not extend beyond the hinged end of shank 66, but bar 62 does so extend at support end 62' to act as a stiffening reinforcement to aid the transmission of force through lever 60. A hole 63 is formed through handle 68 for securement during storage (see FIGS. 3 and 10).

As disclosed above, the sliding jack post stand 10 of the present invention facilitates lateral movement of a supported trailer tongue in either of two opposite directions along a line perpendicular to the trailer tongue with the application of a downward force on lever 60 by an operator standing on one side of the trailer tongue. The improvement in structure over the prior art of the '143 patent is clearly illustrated by comparison of FIG. 5 and FIG. 6.

Figure 5:
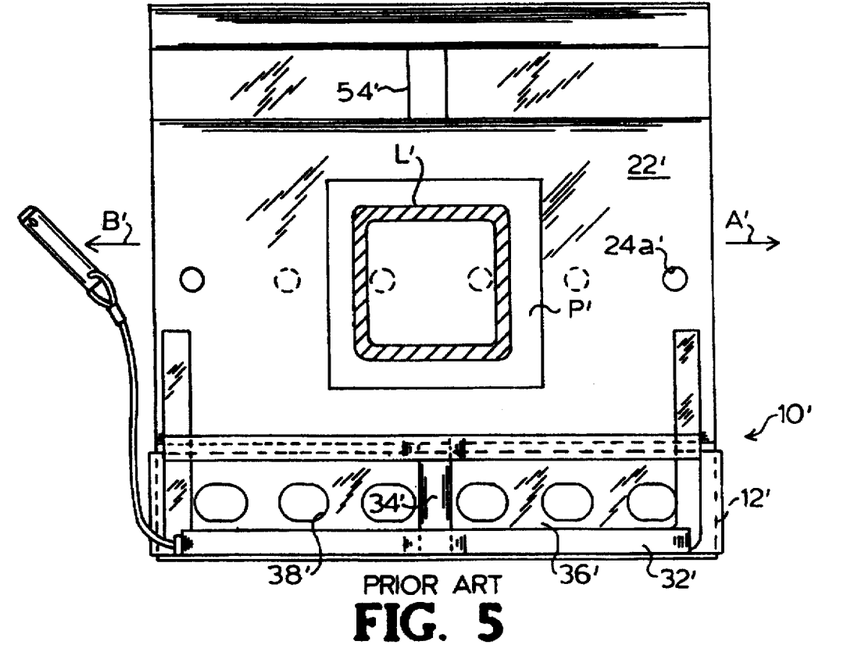
FIG. 5 is a top plan view of a sliding jack post stand of the prior art according to U.S. Pat. No. 5,340,143.
Figure 6:
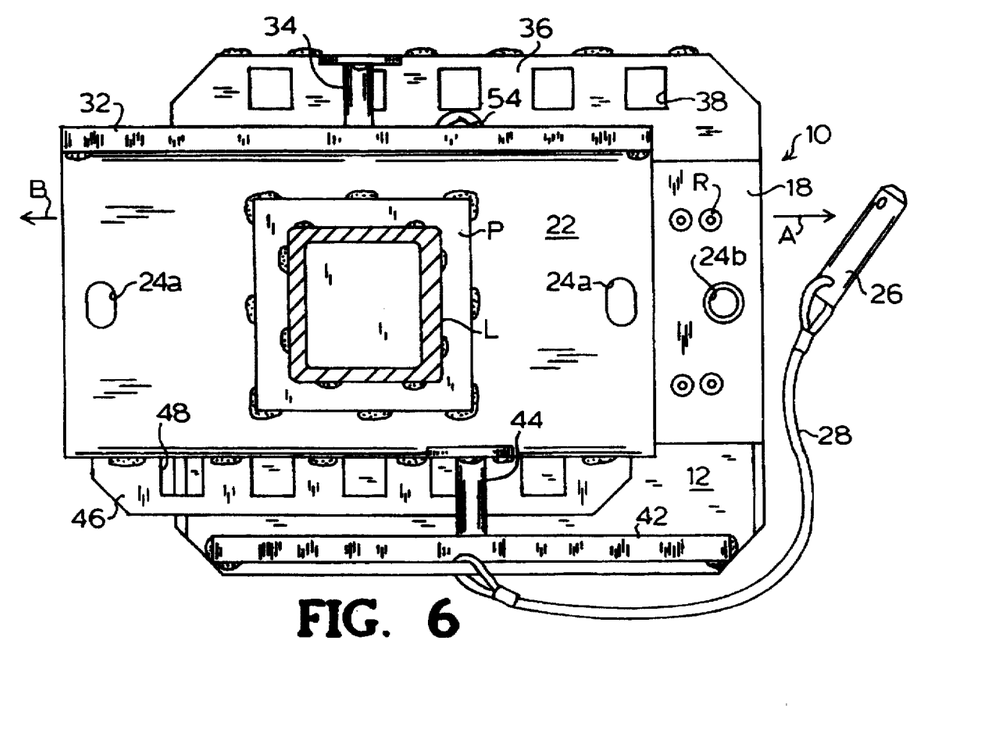
FIG. 6 is a top plan view of the sliding jack post stand of the present invention.

FIG. 5 shows a top plan view of the prior art sliding jack post stand 10' with nest plate 36,' containing oval nests 38', being affixed to base plate 12'. Fulcrum 34' is attached to fulcrum frame 32' which is connected to slider 22'. Standing on the "A" side of prior art sliding jack post stand 10', one would move slider 22' in the direction indicated by arrow A' by placing a lever (not shown) across fulcrum 34' to engage nest 38' and applying downward pressure. In order to move slider 22' in the direction indicated by arrow B', one would then either move to the opposite side of sliding jack post stand 10' and use downward pressure on the lever or remain on the same side of sliding jack post stand 10' and apply upward pressure to the lever. As discussed above, moving to the opposite side of sliding jack post stand 10' (and the trailer) is not convenient, and employing a lifting force on the lever increases a likelihood of back injury.

In the sliding jack post stand 10 of the present invention (shown in FIG. 6), similar structure to that of the prior art sliding jack post stand exists in base nest plate 36 being affixed to base plate 12 and slider fulcrum 34 being connected through fulcrum frame 32 to slider 22. To avoid the need for the operator to change position relative to sliding jack post stand 10 or to use an upward force on the lever, an oppositely configured set of fulcrum and nest components is provided. Base fulcrum 44 is fixedly mounted on fulcrum frame 42 which is fixedly mounted on base plate 12. Slider nests 48 are formed in nest plate 46 which is fixedly mounted to slider 22. Thus, a downward force applied from the "A" side of sliding jack post stand 10 to a lever placed across slider fulcrum 34 and engaging a base nest 38 will cause slider 22 to move in the direction indicated by arrow A. A downward force applied also from the "A" side of sliding jack post stand 10 to a lever placed across base fulcrum 44 and engaging slider nest 48 will cause slider 22 to move in the direction indicated by arrow B. In the case of both movements the force applied to the lever handle is directed downward, as per arrow C, and it is applied with the operator standing on the "A" side of sliding jack stand 10.

At certain times, for example when the trailer is being towed and jack post leg L is raised, it is preferred to keep slider 22 from moving laterally. In order to secure slider 22 in a selected position relative to ground plate 12, locking pin 26, connected to base plate 12 by leash 28, is inserted into locking hole 24a in slider 22 and one of several locking holes 24b extending through low friction plate 18 and support plate 16. At other times, for example, when the trailer is positioned in alignment with a pintle hitch, use of an off-center locking hole 24b is desired. Holes 24a in slider 22 are formed somewhat larger than locking pin 26 and oval in shape to ease pin entry while preventing slider movement.

As illustrated in FIGS. 3 and 10, sliding jack post stand 10 is typically positioned under the jack post leg L of a trailer tongue T in an orientation such that the direction of sliding A–B is substantially perpendicular to the longitudinal length of trailer tongue T. When trailer tongue T is not aligned with the towing vehicle pintle hook H, lever 60 is used as described above to move trailer tongue T laterally (direction A to B) to achieve such alignment. A storage sleeve 74 is mounted onto a side wall of trailer tongue T by means of angle bracket 76 which has a locking hole 78 formed vertically therethrough. When not in use, lever 60 is inserted through storage sleeve 74 and a locking pin (not shown) is placed through locking hole 63 in handle 68 and locking hole 78 in bracket 76 to safely secure handle 60 during transport.

In the preferred embodiment, all components are metallic with the exception of low friction plate 18 which is formed of Delrin® plastic (E.I. Dupont de Nemours & Company). The metal parts are typically assembled by welding, while the low friction plate is assembled to the support plate by rivets or other type fasteners. For ease of assembly and disassembly, stop 54 comprises a bolt inserted through a hole in stationary base nest plate 36 at a central portion of a line between lower ends 54a and 54b of sliding fulcrum 32 and a mating nut secured thereto.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A sliding jack post stand for the alignment of a trailer with a hitch of a towing vehicle, comprising:
   (a) a base assembly;
   (b) a slider mounted in substantially linear sliding relation to said base assembly and adapted for supporting a jack post of a trailer on an upper surface thereof;
   (c) said base assembly having a first fulcrum mounted thereon and a first series of nests formed therein;
   (d) said slider having a second fulcrum mounted thereon and a second series of nests formed therein;
   (e) said first fulcrum of said base assembly being located with respect to said second series of nests of said slider such that a lever bearing on said first fulcrum and engaging a selected one of said second series of nests causes said slider to move in a first direction;
   (f) said second fulcrum of said slider being located with respect to said first series of nests of said base assembly such that a lever bearing on said second fulcrum and engaging a selected one of said first series of nests causes said slider to move in a second direction opposite to said first direction; and (g) a stop for preventing said slider from moving beyond a selected distance in said first and said second direction.

2. The sliding jack post stand of claim 1, wherein said base assembly includes a ground engaging structure and low friction means for slidingly supporting said slider a selected distance above and substantially parallel thereto.

3. The sliding jack post stand of claim 1, further comprising an articulated lever extending between a handle end and an engagement end and capable of transmitting a force applied to its handle in a first direction to the engagement end thereof but not capable of transmitting a force applied to its handle end in a second direction.

4. A sliding jack post support assembly for use with a trailer having a forward tow structure fitted with a jack post and when supporting the jack post enabling the adjustment of the trailer tow structure with respect to a towing vehicle to be hitched thereto, said jack post support assembly comprising:

(a) a base having a ground engaging portion and a first elevated horizontal plate;

(b) a second elevated horizontal plate supported by and adapted for moving longitudinally of said first plate in a plane parallel thereto, said second plate including means on an upper surface thereof for receiving a lower end of the jack post being supported by said assembly;

(c) means for limiting both longitudinal and lateral movement of said second plate relative to said first plate;

(d) a first fulcrum supported on said base;

(e) a second fulcrum supported on said second plate;

(f) a lever extending between a handle end and an engagement end;

(g) a first plurality of bearing surfaces longitudinally disposed on said base;

(h) a second plurality of bearing surfaces longitudinally disposed on said second plate; and (i) said lever being operative when the handle end thereof is forced downward:

(aa) when bearing on said first fulcrum and having its engagement end engaged with a selected one of said second plurality of bearing surfaces to force said second plate to move on said base in a first direction; and (bb) when bearing on said second fulcrum and having its engagement end engaged with a selected one of said first plurality of bearing surfaces to force said second plate to move on said base in a second direction opposite to said first direction.

5. The jack post support assembly as claimed in claim 4 further comprising means providing a low-friction support for said second plate on said first plate.

6. The jack post support assembly as claimed in claim 5, wherein said bearing surfaces are formed as apertures of uniform shape in said base and second plate and said lever engagement end is shaped so as to be able to fit loosely within a selected said aperture but without being able to rotate therein.

7. The jack post support assembly as claimed in claim 6 wherein each said aperture is rectangular in shape and the engagement end of said lever has a corresponding rectangular cross sectional shape.

8. The jack post support assembly as claimed in claim 7 wherein the engagement end of said lever is formed with a notch for engaging an edge of said aperture so as to prevent accidental disengagement therefrom.

9. In a sliding jack post support assembly, a lever with a hinged connection intermediate a handle end and an engagement end thereof such that said lever is capable of transmitting a force applied to its handle end in a first direction to its engagement end but is not capable of transmitting a force applied to its handle end in a second direction.

* * * * *